United States Patent [19]
Dorf

[11] Patent Number: 6,000,608
[45] Date of Patent: Dec. 14, 1999

[54] MULTIFUNCTION CARD SYSTEM

[76] Inventor: Robert E. Dorf, 904 Bromley Way, Raleigh, N.C. 27615

[21] Appl. No.: 08/891,261

[22] Filed: Jul. 10, 1997

[51] Int. Cl.⁶ .................................................. G06K 5/00
[52] U.S. Cl. ........................................... 235/380; 235/375
[58] Field of Search .................................. 235/380, 375, 235/381, 382, 492, 493; 902/1, 2, 8, 10, 12, 22, 24, 25, 26, 27

[56] References Cited

U.S. PATENT DOCUMENTS

| | | | |
|---|---|---|---|
| 4,491,725 | 1/1985 | Pritchard | 235/375 |
| 4,700,055 | 10/1987 | Kashkashian, Jr. | 235/379 |
| 4,731,818 | 3/1988 | Clark, Jr. et al. | 379/144 |
| 4,831,647 | 5/1989 | D'Avello et al. | 379/91 |
| 4,900,903 | 2/1990 | Wright et al. | 235/380 |
| 4,951,308 | 8/1990 | Bishop et al. | 379/91 |
| 4,963,722 | 10/1990 | Takeuchi | 235/382.5 |
| 4,990,904 | 2/1991 | Wright et al. | 235/381 |
| 5,101,098 | 3/1992 | Naito | 235/475 |
| 5,144,649 | 9/1992 | Zicker et al. | 379/59 |
| 5,146,067 | 9/1992 | Sloan et al. | 235/381 |
| 5,147,021 | 9/1992 | Maruyama et al. | 194/217 |
| 5,212,369 | 5/1993 | Karlisch et al. | 235/380 |
| 5,227,612 | 7/1993 | Le Roux | 235/379 |
| 5,243,174 | 9/1993 | Veeneman et al. | 235/381 |
| 5,264,689 | 11/1993 | Maes et al. | 235/492 |
| 5,310,997 | 5/1994 | Roach et al. | 235/375 |
| 5,352,876 | 10/1994 | Watanabe et al. | 235/381 |
| 5,409,092 | 4/1995 | Itako et al. | 194/210 |
| 5,440,108 | 8/1995 | Tran et al. | 235/381 |
| 5,450,938 | 9/1995 | Rademacher | 194/206 |
| 5,469,497 | 11/1995 | Pierce et al. | 379/115 |
| 5,491,326 | 2/1996 | Marceau et al. | 235/381 |
| 5,500,514 | 3/1996 | Veeneman et al. | 235/381 |
| 5,504,808 | 4/1996 | Hamrick, Jr. | 379/144 |
| 5,511,114 | 4/1996 | Stimson et al. | 379/114 |
| 5,513,117 | 4/1996 | Small | 364/479 |
| 5,524,073 | 6/1996 | Stambler | 380/24 |
| 5,530,232 | 6/1996 | Taylor | 235/380 |
| 5,542,081 | 7/1996 | Geronimi | 395/800 |
| 5,557,516 | 9/1996 | Hogan | 364/406 |
| 5,559,885 | 9/1996 | Drexler et al. | 380/23 |
| 5,563,934 | 10/1996 | Eda | 379/144 |
| 5,572,004 | 11/1996 | Raimann | 235/380 |
| 5,577,109 | 11/1996 | Stimson et al. | 379/112 |
| 5,578,808 | 11/1996 | Taylor | 235/380 |
| 5,621,787 | 4/1997 | McKoy et al. | 379/144 |
| 5,652,421 | 7/1997 | Veeneman et al. | 235/381 |
| 5,682,027 | 10/1997 | Bertina et al. | 235/380 |
| 5,815,561 | 9/1998 | Nguyen et al. | 379/115 |

*Primary Examiner*—Thien Minh Le
*Assistant Examiner*—Daniel Felten
*Attorney, Agent, or Firm*—Stroock & Stroock & Lavan LLP

[57] ABSTRACT

Disclosed is a multifunction card system which provides a multifunction card capable of serving as a prepaid phone card, a debit card, a loyalty card, and a medical information card. Each card has an identification number comprising a bank identification number which assists in establishing communications links. The card system can be accessed from any existing point-of-sale (POS) device. The POS device treats the card as a credit or debit card and routes transaction data to a processing hub using the banking system. The processing hub coordinates the various databases corresponding to the various functions of the card.

66 Claims, 2 Drawing Sheets

MULTIFUNCTION CARD SYSTEM

FIELD OF THE INVENTION

The present invention relates generally to debit card systems, both bank-issued and non-bank-issued, and more particularly to a multifunction card system that can be accessed by a variety of standard point-of-sale devices, by phone, by fax, or over the Internet.

BACKGROUND OF THE INVENTION

I. Debit Cards

Banking institutions often issue debit cards to their customers to give them access to funds from their savings or checking accounts. Such a debit card might be an on-line debit card or an off-line debit card. On-line debit cards, often referred to as automatic teller machine (ATM) cards, require a personal identification number (PIN) to be entered into an ATM or point-of-sale (POS) device in order to authorize the transaction. Once completed, the transaction clears the bank account immediately. Off-line debit cards function like credit cards, and usually carry the VISA® or MasterCard® logo. A retailer processes the card like a credit card and the customer signs a receipt. The funds then clear the bank account in one to three days.

While such debit cards are extremely useful and provide convenience for bank depositors, they generally do not serve a plurality of functions. Therefore, there is a need in the art for a debit/credit card capable of performing a plurality of functions, such as an electronic gift certificate card, a prepaid phone card, and a loyalty card, all in a real-time secure environment. There is also a need in the art for a system which can provide a card substitute for travelers checks and money orders which can be accepted by any POS device or ATM for financial transactions. Further, there is a need for a processing center which can manage such a multifunction card system.

II. Prepaid Phone Cards

Prepaid card systems are used by the telephone industry to allow customers to prepurchase long distance calling time. Such cards are typically purchased in predefined value increments. The card provides the customer with an amount of long distance calling time equivalent to the predefined value increment.

Each of the cards has an identification number printed or magnetically stored on it. The identification number is also stored in a record in a database maintained by the card issuer. This record also stores the predefined value of the card. When the cards are sent to the retail location from which they will be sold, the corresponding records in the database are activated, thus allowing the card to be used immediately by a customer. To use the card, the customer dials a toll free number to access the card issuer's system, enters the identification number, and then makes the desired long-distance call. During the call, the value of the card in the database is decremented accordingly. When the value of the card is exhausted, the call terminates. If the customer ends the call before the value of the card is exhausted, the remaining value may be used for additional calls. Once the entire value of the card has been used, it is discarded.

These prior art prepaid phone card systems have several disadvantages. First, since the cards are active while on the shelf in the retail location, they may be stolen by a thief and easily used. Second, the prior art systems do not allow the customer to purchase a card having any given value, nor do they allow the customer to recharge the value of the cards once the are depleted.

One way to address some of the drawbacks of prior art prepaid phone card systems would be to install activation terminals unique to the prepaid card issuer. This is referred to as a "closed system." U.S. Pat. No. 5,577,109 to Stimson et al. discloses such a closed system. In the Stimson system, the cards are not preactivated. Each of the retail locations from which cards are to be sold is provided with a dedicated activation terminal which allows the retail operator to set the value of the card at the time of the sale. The activation terminal connects to the card issuer's system to pass along the value amount and to request activation of the card. Depleted cards can be recharged in the same manner as they are sold. A serious disadvantage of the Stimson system is that it requires single-function dedicated hardware to be installed in each retail location, resulting in a very inflexible and expensive system.

Thus, there is a need in the art for a prepaid phone card activating system which is easily and inexpensively deployed, and which allows cards to be purchased in varying amounts and to be recharged without requiring the use of a closed system to handle the transactions.

III. Loyalty Cards

Loyalty cards are used to reward consumers for purchasing goods or services. For instance, airlines commonly reward frequent fliers with points for each mile flown with that airline. When the consumer accumulates a certain number of points, he or she is rewarded with free or discounted air fare. In this and other similar systems, the loyalty card issuer directly participates in the sale transaction. Such systems, however, do not allow a manufacturer of a product which is sold by an unrelated retailer to immediately reward the ultimate purchaser of the product with loyalty points. Since the manufacturer does not know of the ultimate sale until much later, if ever, it is difficult for such a manufacturer to conduct a loyalty program. Thus, there is presently no method for creating a product-specific loyalty card as opposed to a retailer-specific card. Nor is there a system for communicating loyalty data to databases not located at the retail establishment.

Furthermore, prior art loyalty programs generally do not credit the consumer's loyalty account in real-time as a purchase transaction takes place. Therefore, the consumer is unable to enjoy the benefits of their added loyalty points immediately. Finally, prior art loyalty programs commonly require significant startup efforts and expenses before the system is operational. Therefore, there is a need in the art for a real-time loyalty card system which is easily deployed, and which is capable of providing a product-specific loyalty card as well as a retailer-specific card. There is also a need for a system which can reward customers automatically for their loyalty and communicate this loyalty reward to databases other than at a retail location.

IV. Information Retrieval

Often, it is important to access certain types of information in a very fast and convenient manner. For example, a person's medical history can be extremely important in assessing the propriety of certain medical procedures during a medical emergency. Presently, in order to obtain a patient's medical history, the patient or his or her doctor must request the appropriate files from the patient's previous doctor(s). It often takes a number of days to receive the requested information. In a medical emergency, this delay is often far too long. Thus, there is a need for patients to have control over their own medical history data. Further, there is a need for this data to be instantly available to the patient, or the patient's doctor if the patient is incapacitated.

V. Multifunction Card

Due to the proliferation of various types of cards (e.g., credit/debit, long-distance calling, loyalty, etc.) over the last couple of decades, it has become increasingly difficult to keep track of each individual card. There is a need for a card system which can serve a number of functions, thus allowing the consumer to have one card which may act as their card for financial transactions, long-distance telephone calls, loyalty information, and medical information.

SUMMARY OF THE INVENTION

The present invention solves the problems associated with prior art card systems by providing an improved multifunction card system. The multifunction card system comprises at least one electronic gift certificate card having a unique identification number encoded on it, the identification number comprising a bank identification number corresponding to the multifunction card system; means for receiving electronic gift certificate card activation data from an existing standard retail point-of-sale device when the electronic gift certificate card is swiped through the point-of-sale device, the electronic gift certificate card activation data comprising the unique identification number of the electronic gift certificate card and an electronic gift certificate activation amount; means for activating an account corresponding to the electronic gift certificate card with a value equal to the electronic gift certificate activation amount; and means for allowing a user of the electronic gift certificate card to purchase goods having a value up to the electronic gift certificate activation amount.

The multifunction card system further comprises at least one phone card having a unique identification number encoded on it, the identification number comprising a bank identification number corresponding to the multifunction card system; means for receiving phone card activation data from an existing standard retail point-of-sale device when the phone card is swiped through the point-of-sale device, the phone card activation data comprising the unique identification number of the phone card and a phone card activation amount; means for activating an account corresponding to the phone card with a value equal to the phone card activation amount; and means for allowing a user of the phone card to obtain long distance telephone calling time having a value up to the phone card activation amount.

In a preferred embodiment, the multifunction card system further comprises at least one loyalty card having a unique identification number encoded on it, the identification number comprising a bank identification number corresponding to the multifunction card system; means for receiving loyalty data from an existing standard retail point-of-sale device when the loyalty card is swiped through the point-of-sale device, the loyalty data comprising the unique identification number of the loyalty card and a purchase amount; and means for crediting an account corresponding to the loyalty card with a number of loyalty points proportional to the purchase amount.

Optionally, the multifunction card system of the present invention may also comprise at least one medical information card having a unique identification number associated with it, the medical information card belonging to a patient; a database comprising at least one record corresponding to the medical information card, the record containing medical history information about the patient; and means for allowing an authorized requester to obtain the medical history information about the patient using the unique identification number associated with the medical information card.

BRIEF DESCRIPTION OF THE DRAWINGS

The present invention will be more fully understood by reference to the following detailed description when considered in conjunction with the following drawings wherein like reference numbers denote the same or similar portions or processes shown throughout the several Figures, in which.

DETAILED DESCRIPTION OF THE INVENTION

Figure 1:
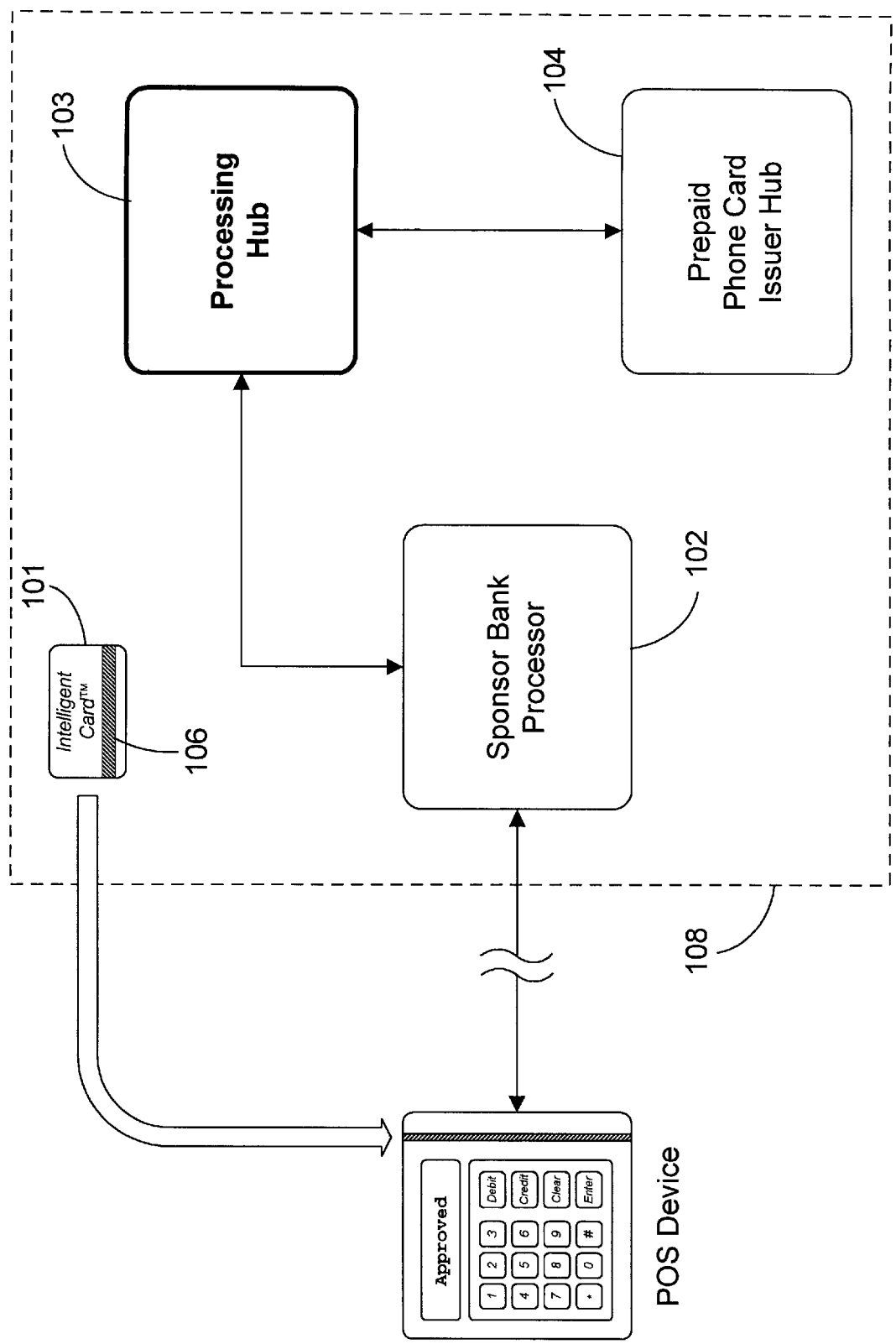
FIG. 1 is a block diagram of the multifunction card system of the present invention.

The present invention is a multifunction card system which allows for the activation of prepaid phone cards and the use of Electronic Gift Certificate™ cards, loyalty cards, debit cards, and medical information cards. Further, the system provides for the immediate linkage of these various functions. FIG. 1 illustrates the multifunction card system 108 of the present invention. The system 108 comprises a plurality of cards 101, a sponsor bank processor 102, and a processing hub 103, which serves as the nerve center of the system 108. If the system 108 is to provide prepaid phone cards, it will also include a prepaid phone card issuer hub 104 maintained by a prepaid phone card issuer. In order to achieve the desired functionality, the system 108 uses existing banking networks in a unique and novel way to gain access to virtually all existing retail point-of-sale (POS) devices 105. These devices 105 include stand-alone POS terminals, cash registers with POS interfacing, computers with POS interfacing, and other similar devices which can be used to access the banking system. As used herein, POS device includes all such devices, whether data entry is effected by swiping a card through the device or by manual entry.

To access these POS devices, the operator of the system 108 must apply for and obtain a Bank Identification Number (BIN) from the American Banking Association. The BIN serves as a unique identifier of the multifunction card system 108 within the banking network. The BIN is encoded on a magnetic strip 106 on each card 101 in the system 108 as a part of the card's identification number. Alternatively or additionally, the BIN and identification number could be encoded as a bar code, embossed on the surface on the card 101 in numerals for manual entry, or provided by any other means known in the art.

Preferably, the BIN's first digit will be the same number as the first BIN digit used by a popular card issuer. This is because POS devices are preprogrammed to recognize only certain types of cards, such as those issued by VISA® and MasterCard®, American Express®, etc. As a rule, these POS devices must be reprogrammed before they will accept a new type of card. However, since POS devices already recognize cards issued by these popular card issuers, a new type of card will also be recognized by such devices if it has a BIN that begins with the same number used by one of the popular card issuers. Since VISA® and MasterCard® are the most universally accepted cards, the BIN of the multifunction card system 108 of the present invention preferably will begin with the same number used by either VISA® or MasterCard® (i.e., "4" or "5", respectively). By using one of these numbers, the card 101 will be recognized by almost all existing POS devices 105 as a debit or credit card, and its transactions will be automatically routed by the banking system to the correct destination. This occurs regardless of the type of POS device 105 used, since all such devices are designed to interface with the banking network. Although the BIN number will preferably begin with a "4" or "5", it may begin with any number that is recognized by POS devices 105.

The operator of the system 108 should also have a sponsoring bank whose bank processor 102 will serve as the link between the processing hub 103 and the banking network. Alternatively, the operator of the system 108 could itself be a banking institution.

By providing a means for any given POS device 105 to connect to the processing hub 103, the system 108 allows a retailer to remotely activate or add value or loyalty data to a system card. The method by which this occurs is set forth more fully below in the context of the various functions of the card.

I. Prepaid Phone Card

Figure 2:
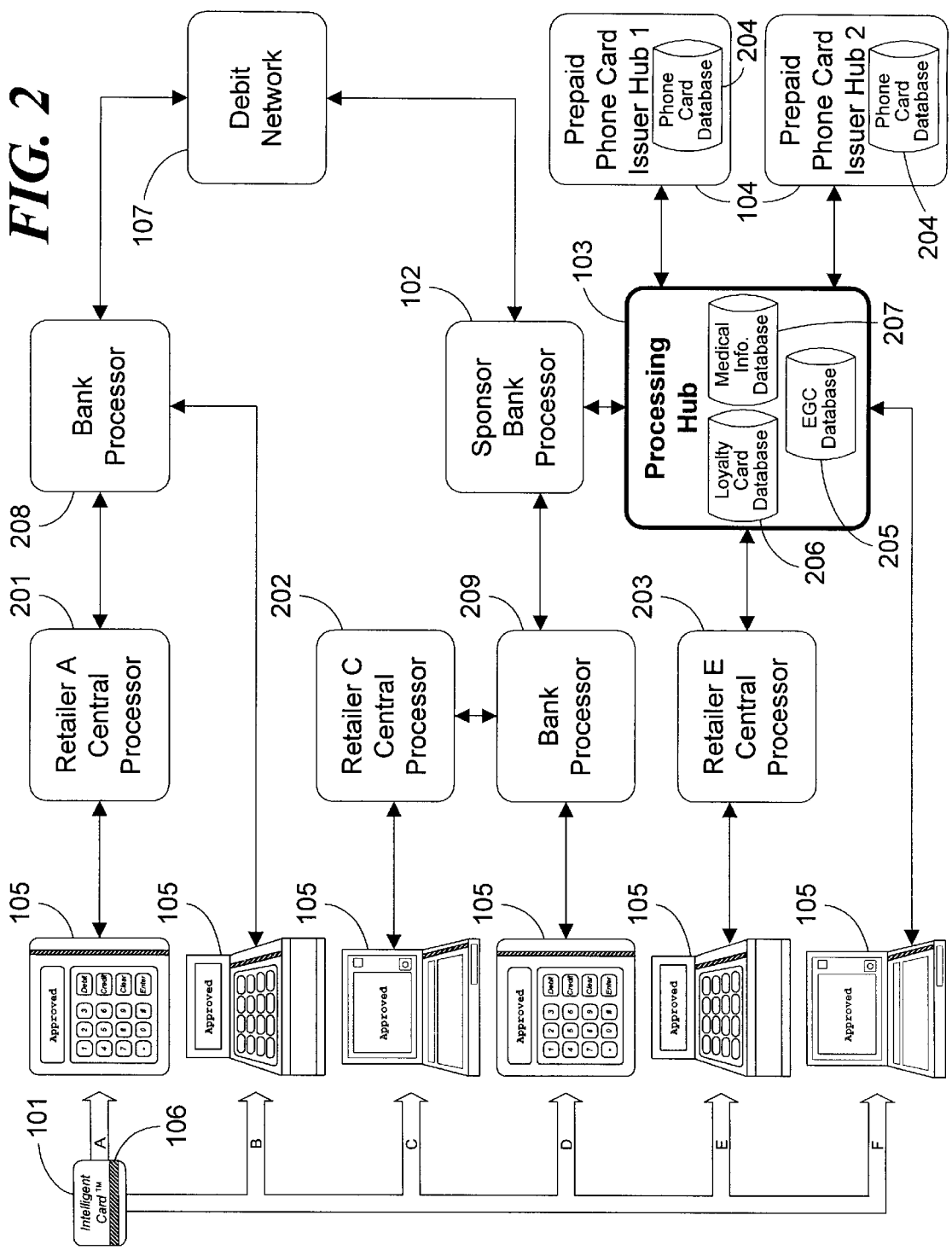
FIG. 2 is block diagram demonstrating the various ways in which a retail point-of-sale device might connect to the multifunction card system of the present invention.

A plurality of long distance service providers may contract with the operator of the multifunction card system 108 to issue prepaid phone cards 101 for use in the system 108. Alternatively, a long distance service provider may itself be the operator of the system 108. The long distance service provider will be referred to as a phone card issuer. A phone card issuer provides prepaid phone cards 101 to retailers who sell the cards 101 at their retail locations. Until activated, the cards 101 have no intrinsic value associated with them. Therefore, they may be placed on store shelves in easily accessible areas without the fear of losses due to theft. When a customer wishes to purchase or recharge one of the cards 101, he or she informs the sales clerk of the monetary amount desired. Depending upon the system chosen by the particular phone card issuer, this amount may be one of a finite number of predefined amount increments, or may be selected by the customer. The clerk swipes the card 101 through the POS device 105. Depending upon the amount of customization that has occurred at the retailer's location, there are a number of ways in which the POS device 105 may connect to the system's 108 processing hub 103 to carry out the transaction. FIG. 2 illustrates several of these methods.

The first two methods shown in FIG. 2, methods A and B, are the most easily deployed, but cost the most on a per-transaction basis. To route information to the processing hub 103, these methods employ the debit network 107 used by banking institutions. The retailer in method A (retailer A) has a central processor which controls each of its POS devices 105 and connects them to a processor 208 at a bank chosen by the retailer. Retailer B's POS device 105 connects directly to the bank processor 208. Otherwise, the two methods are the same.

Banking regulations currently require that any transaction taking place over the debit network 107 must result in an actual transfer of funds. Since this phone card activation transaction is not a typical debit transaction, it is presently desirable to keep the official amount of the transaction to a minimum, yet still comply with the banking regulations. Therefore, regardless of the actual sale amount, the clerk enters a nominal transaction amount. In a preferred embodiment, the nominal transaction amount is keyed to the actual transaction amount (e.g., $0.01 nominal=$10.00 actual, $0.02 nominal=$20.00 actual, etc.). Therefore, the actual transaction amount can be ascertained from the nominal amount. In this embodiment, the card could only be activated or recharged in predefined increments. If the card is to have a fixed value, the activation amount could also be encoded on the magnetic strip 106 of the card 101 as part of the card's identification number.

In an alternate embodiment, the card could be activated or recharged in any amount desired by the customer. In this case, the nominal transaction amount would be a fixed value, such as $0.01. Once the nominal transaction amount is entered, the actual sale amount could then be entered on the PIN pad of the POS device 105 instead of the personal identification number (PIN) that would normally be entered when using a debit card. By entering the actual sale amount in this manner, it can be any desired amount.

In either case, before it transmits the data, the POS device 105 encrypts the information to be sent. This information includes the identification number read from the card's magnetic strip 106, the nominal transaction amount, and the actual sale amount if it was entered into the PIN pad. The system 108 contains software which will decrypt and translate the data upon receipt. Once the encryption has taken place, the POS device 105 transmits the data either directly or via the central processor 201 to the bank processor 208. The bank processor 208 receives the data and transmits it over the debit network 107. The debit network 107 then forwards the data to the sponsoring bank's processor 102. As mentioned earlier, the sponsoring bank is one which has agreed to operate as a link between the debit network 107 and the processing hub 103.

As mentioned earlier, banking regulations as they currently exist require that transactions taking place over the debit network must result in a transfer of funds. Preferably, in order to comply with the banking regulations, the sponsoring bank transfers the nominal amount (e.g., $0.01) from one account belonging to the retailer to another account also belonging to the retailer. The bank processor 102 then forwards the data from the POS device 105 to the processing hub 103.

In methods C and D, the retailers' central processor 202 or POS device 105, respectively, again connect to a processor 209 at a retailer-chosen bank. By agreement between the operator of the multifunction card system 108 and the retailer-chosen bank, this bank processor 209 is programmed to recognize the multifunction card system's BIN and to forward the system's transactions directly to the sponsoring bank's processor 102 rather than using the debit network 107. Since the debit network 107 is not used, it is not necessary to use a nominal sale amount, although such a method would nonetheless work and might be preferred by the retailer for security and bookkeeping purposes. The system 108 could instead be programmed to prompt the clerk for the appropriate information. As in methods A and B, the sponsor bank processor 102 forwards the necessary information to the processing hub 103. Although methods C and D are more efficient than methods A and B on a per transaction basis, they require some customization at the retailer location to cause the retailer to connect to a bank processor 209 that recognizes the system's BIN.

Methods E and F are the least costly methods of connecting to the processing hub 103 (i.e., directly from the retailer's central processor 203 or from the POS device 105 itself). The connection may be made via a toll-free telephone line, a dedicated phone line, over the Internet, or any other standard communication means. Again, however, these methods require the most customization at the retailer location to cause the retailer's system to recognize the multifunction card system's cards and to route their transactions directly to the processing hub 103. Such customization, however, still does not require reprogramming of the POS devices themselves. The connection method chosen may be adjusted to fit the individual retailer's needs.

Regardless of the method used, the data will eventually arrive at the processing hub 103. If the transmission has taken place over the debit network 107, the data must be decrypted using equipment well known in the art for decrypting debit transaction data. Once the data is received and, if necessary, decrypted, the processing hub 103 recognizes the identification number of the card as being associated with a particular prepaid phone card issuer. Next, a security check is performed to verify that this transaction is originating from a retailer that is authorized to sell the prepaid phone cards. If the transaction is originating from an authorized retailer, the transaction will proceed. The processing hub 103 will then forward the card identification number, retail store and POS device information, and amount information to the issuer hub 104 maintained by the prepaid phone card issuer. The issuer hub 104 contains one or more phone card databases 204 which store information about each phone card. When the issuer hub 104 receives the data from the processing hub 103, it activates the record in the phone card database 204 having the same identification number as the card 101. The value field in the record is then increased by the appropriate purchased amount. If the card is of a fixed value, the record is simply activated. The issuer hub 104 then returns an authorization number which travels back along the same path to the originating POS device 105. The customer may then dial the prepaid phone card issuer's toll free number, enter the card number and any required PIN, and obtain long distance calling time having a value up to the value of the card stored in the phone card database 204.

Each activation or recharge transaction is recorded by the system 108. At the end of the day, a report is preferably created for each card issuer and retail location so that their accounts can be reconciled. Transfer of funds between these parties may then take place by any commercially acceptable means.

II. Electronic Gift Certificate™ Card

The multifunction card system 108 of the present invention is also capable of providing an Electronic Gift Certificate™ (EGC) card 101 for a retail issuer. Such a card 101 could be sold by the retail issuer for making purchases only in the retail issuer's stores or for use in a plurality of stores. As in the phone card context, the customer would ask the sales clerk for an Electronic Gift Certificate™ card of the desired amount. If the customer already has an Electronic Gift Certificate™ card, he or she might ask the clerk to add the desired amount to the already existing balance. The clerk swipes the card 101 and enters the transaction amount, either directly or using a nominal amount and/or the PIN pad, depending upon whether the debit network 107 is to be used. Using one of the methods discussed above, the data then makes its way to the processing hub 103.

Alternatively, the activation could occur by processing the card 101 as a typical debit card using the debit network 107. In such a case, the retail issuer would maintain accounts with the sponsor bank. When an activation transaction takes place, the bank would transfer the activation amount from a general account to an account corresponding to the card. If the card is to be accepted at a number of retail locations, the account corresponding to the card could be opened in the name of the card holder if appropriate paperwork is submitted to the bank. In this manner, the card could be used at any retail location capable of processing debit transactions. This would allow the card to serve as a prepaid card substitute for travelers checks and money orders. Regardless of the way in which the card is processed, the transaction data eventually makes its way to the processing hub 103.

Upon receipt of the transaction data, the hub 103 recognizes the card 101 as being an Electronic Gift Certificate™ card of the retail issuer and activates or recharges the card 101 in the appropriate amount in an EGC database 205 maintained at the processing hub 103.

Optionally, the Electronic Gift Certificate™ card 101 could also be recharged using a credit card via an on-line connection to the processing hub 103, such as over the Internet.

Once a card 101 has been activated or recharged, the recipient of the card 101 is allowed to make purchases using the card. If the card is only for use in the retail issuer's stores, the purchase transaction might proceed in much the same manner as the activation process. The clerk would swipe the card 101 and enter the purchase amount. If the transaction is to be transmitted over the debit network, a nominal transaction amount may be used, and the actual amount entered instead of the PIN. A special code is used to indicate that the transaction is a purchase transaction rather than an activation or recharge transaction. If the debit network is used, the code could be the first digit of the PIN, followed by the purchase amount, thus allowing the software of the system 108 to recognize the type of transaction and decrypt the data accordingly.

Upon receipt of the data via one of the methods described above, the processing hub 103 compares the purchase amount to the balance for the card in the EGC database 205. If the balance is greater than the purchase amount, the processing hub 103 will decrement the record in the database and will send back an approval code which will allow the transaction to proceed. If a sufficient balance is not present, the processing hub 103 will notify the POS device 105 that the transaction may not proceed. Preferably, an automated toll free number is provided for the holder of the card 101 to verify the remaining balance. The processing hub 103 preferably maintains records of all transactions.

If the card 101 is for use in many retail locations, it would instead be processed during purchase transactions as a typical debit card, preferably using the debit network 107. In this case, either the retail issuer or the cardholder must have an account with the sponsor bank. When a purchase transaction takes place, the clerk or cardholder simply swipes the card and receives back a response in the same manner as a normal debit transaction. If sufficient funds are present in the account corresponding to the card, the transaction will be approved. The sponsor bank then transfers the purchase amount from the retail issuer's or cardholder's account to an account belonging to the retail location at which the purchase occurred, which account may or may not be located at the sponsor bank. The transaction data is then forwarded to the processing hub 103 so that the EGC database 205 can be updated.

In a preferred embodiment, an Electronic Gift Certificate™ card could also be used to obtain long distance calling time in addition to making purchases in the retail issuer's store. The retail issuer could contract with a prepaid phone card issuer to provide the calling time. When the card 101 is activated, the phone card issuer simultaneously creates an entry in its phone card database 204 corresponding to the entry in the EGC database 205. The card 101 can then be used in exactly the same manner as the prepaid phone card discussed above. In order to prevent the use of the Electronic Gift Certificate™ card simultaneously to make purchases and to obtain long distance calling time, a safety procedure is provided. When the card 101 is used to make a long distance call, the phone card issuer hub 104 instructs the processing hub 103 to seize the record corresponding to the card 101 in the EGC database 205. With the record seized, the system 108 will not authorize any purchasing activity for the duration of the call. When the call terminates, the phone card issuer hub 104 decrements the appropriate record in its phone card database 204 and instructs the processing hub 103 to do the same in the EGC database 205. The record in the EGC database 205 is then unseized. When the card 101 is used to make a purchase, the processing hub 103 similarly instructs the phone card issuer hub 104 to seize the appropriate record in the phone card database 204 for the duration of the transaction. When the transaction is over, the records in the EGC database 205 and the phone card database 204 are decremented appropriately.

In the preferred embodiment of the invention, the retail issuer is also given the capability to award loyalty points to the bearer of the Electronic Gift Certificate™ card in recognition of purchases or recharges made. In such a case, the processing hub 103 maintains a separate loyalty card database 206. When the Electronic Gift Certificate™ card bearer adds money to the card 101, or makes a purchase using the card 101, the system 108 may add a number of points proportional to the purchase price to the card's record in the loyalty card database 206. Alternatively points could be awarded based upon the frequency of card usage rather than purchase amounts. In either case, when the card bearer reaches certain predefined point plateaus, he or she may be rewarded by the retail issuer with additional card value or with long-distance calling time.

III. Loyalty Card

Not unlike the loyalty feature add-on of the Electronic Gift Certificate™ card, the system 108 of the present invention may provide a separate loyalty card much like a frequent flier card that can have points added at virtually any POS device 105.

A. Product/Manufacturer-Specific Loyalty Card

The card could be issued by a certain manufacturer to reward a customer with loyalty points for purchasing the manufacturer's product, regardless of the retail location of the purchase. This reward could be tied to the purchase of a single product type or to all of the manufacturer's products. The loyalty points awarded could be varied based upon any promotional campaigns being conducted by the manufacturer. Points are added to the card at participating retail locations which sell the manufacturer's product(s). The card 101 is swiped at any retail location, the purchase amount for the manufacturer's product is entered using the PIN pad of the POS device 105, and the data is transmitted to the processing hub 103 using one of the methods described above. After receiving the data, the processing hub 103 credits the appropriate record in the loyalty card database 206 with a number of points proportional to the purchase price. The card is transportable to any participating retailer. The system 108 allows the manufacturer to connect to the processing hub 103 via an on-line connection to access the loyalty card database 206. Again, the customer could be rewarded when certain point plateaus are reached.

B. Retailer-Specific Loyalty Card

Alternatively, the card could be issued by a particular retailer to reward customers for purchases made in the retailer's location(s). The retailer could award points for any purchase within the store, or could target special promotional items. The card would function in a manner similar to the product-specific card. Once again, the customer is rewarded when certain point plateaus are reached.

Alternatively, the loyalty data could be used to simultaneously credit other databases of the system 108. For instance, instead of awarding loyalty points, the system could add value in real time to a record in the phone database 204 at the prepaid phone card issuer hub 104, thus rewarding the customer with free phone time. Loyalty points might also be converted into a dollar value for use at the retail location. Optionally, the system 108 can keep records of a consumer's purchasing habits for marketing purposes. As with the manufacturer-specific card, the system 108 allows the retailer to connect to the processing hub 103 via an on-line connection to access the loyalty card database 206.

IV. Information Retrieval Card

Finally, the multifunction card system 108 of the present invention is capable of providing an information retrieval card. In an exemplary embodiment, a medical information card which allows access and retrieval of a patient's complete medical history from a multitude of remote locations is provided. Each participating patient's medical information is stored in a record in a medical information database 207 maintained at the processing hub 103. The record contains the identification number encoded on the patient's card 101.

When medical history information data is needed, it may be requested by swiping the card 101 through a POS device 105 at a participating doctor's office or hospital. Preferably, a PIN is entered into the POS device 105 to ensure that only an authorized person is able to request the information. The POS device 105 would then send the request to the processing hub 103 via one of the routes described above. When the processing hub 103 receives the request from the authorized requester, it then immediately sends the information to the requestor via means preselected by the participating doctor's office or hospital. Such means may include electronic mail, facsimile, voice response, and other similar means. The medical history information may be updated by the patient or his or her doctor or insurer by forwarding new information to the operator of the system 108 via an on-line connection, over the Internet, by telephone, by facsimile, or by mail.

As a backup, the request could instead be made using a computer, wherein the computer connects to the processing hub 103 via the Internet or by direct modem connection. The requestor might be allowed to view, print, or download the appropriate medical history information. Alternatively, the request could be made by facsimile or by calling an automated toll free number and entering the card number.

In order to allow a cardholder to keep track of medical savings accounts or various other means for paying for medical services (e.g., Medicare), the system 108 also allows access to a database which maintains the medical funds for the cardholder. As described above under the Electronic Gift Certificate™ section, the system 108 is able to authorize, reject, and cause money to be transferred based upon the cardholder's available medical funds.

V. Intelligent Card™

In the preferred embodiment of the invention, the multifunction card system 108 is capable of providing a single card 101 which is capable of performing all of the foregoing functions. Preferably, the system 108 also allows for the card 101 to be used as an on-line debit card after the cardholder registers with the system. In order to let the system 108 know which function or functions the card 101 is serving in any particular transaction, a code is entered into the PIN pad of the POS device from which the transaction is originating. Alternatively, the system 108 could prompt the user to indicate the proper card function and the databases that must be accessed. Based upon this input, the system 108 carries out the appropriate actions. The system 108 can access each of the databases discussed above and can simultaneously increase or decrease each database as needed by the type of transaction occurring.

VI. Processing Hub Technical Details

The processing hub 103 of the present invention provides front-end POS device management and message processing for card authorization and activations. The processing hub 103 can be implemented using any computer having acceptable processing and storage capacity. It preferably comprises a Stratus RADIO Cluster™, which is a scaleable system based upon the standard Intel Pentium processor. The Stratus RADIO Cluster™ provides the processing hub 103 with a high degree of reliability and fault-tolerance. Since the Stratus system is scaleable, an adequate degree of redundancy can be provided in order to reduce the impact of individual failures. In addition, as demand for the multifunction card system increases, the processing hub 103 can be scaled to meet increasing demands for processing power and storage availability. The modular design of such a hub is upgradable for long term capacity planning and expansion.

The software of the system is preferably written in the C, Force, and Foxpro programming languages. The C language programs are preferably written to interface with specialty external interface boards. Force is preferably used for all on-line transaction processing, while Foxpro preferably provides for database management and the user interface. Since Force and Foxpro share database file structures, on-line transactions may be viewed by the system operators using the Foxpro interface.

In order to provide further reliability, all applications and data are replicated and synchronized across the processing hub 103 by Isis Reliable software. Load distribution among the modules is automatically controlled by the software to improve the response time and throughput. External communications nodes provide the necessary interface requirements of physical connectivity, protocol, message transmission, message validation, and message processing.

While the multifunction card system herein described constitutes the preferred embodiment of the present invention, it is to be understood that the invention is not limited to this precise form of system, and that changes may be made therein without departing from the scope of the invention which is defined in the following claims.

I claim:

1. A multifunction card system, comprising:
   a. at least one electronic gift certificate card having a unique identification number encoded on it, said identification number comprising a bank identification number approved by the American Banking Association for use in a banking network, said identification number corresponding to the multifunction card system;
   b. means for receiving electronic gift certificate card activation data from an unmodified existing standard retail point-of-sale device when said electronic gift certificate card is swiped through the point-of-sale device, said electronic gift certificate card activation data comprising the unique identification number of the electronic gift certificate card and an electronic gift certificate activation amount;
   c. means for activating an account corresponding to the electronic gift certificate card with a balance equal to the electronic gift certificate activation amount;
   d. means for allowing a user of the electronic gift certificate card to purchase goods and services having a value up to the balance of the account corresponding to the electronic gift certificate card; and
   e. means for decreasing the balance of the account corresponding to the electronic gift certificate card by the value of the goods and services purchased.

2. A multifunction card system as recited in claim 1, further comprising:
   a. means for receiving electronic gift certificate card recharge data from an existing standard retail point-of-sale device when said electronic gift certificate card is swiped through the point-of-sale device, said electronic gift certificate card recharge data comprising the unique identification number of the electronic gift certificate card and an electronic gift certificate recharge amount; and
   b. means for increasing the balance of the account corresponding to the electronic gift certificate card by the electronic gift certificate recharge amount.

3. A multifunction card system as recited in claim 1, wherein the first digit of said bank identification number is selected from the group consisting of four and five.

4. A multifunction card system as recited in claim 1, further comprising means for allowing a user of the electronic gift certificate card to obtain long distance telephone calling time, wherein the total of the value of the goods and services purchased and the long distance telephone calling time obtained cannot exceed the balance of the account corresponding to the electronic gift certificate card.

5. A multifunction card system as recited in claim 4, wherein said means for receiving electronic gift certificate activation data from an existing standard retail point-of-sale device when said electronic gift certificate card is swiped through the point-of-sale device employs the banking network.

6. A multifunction card system as recited in claim 4, further comprising means for associating loyalty data with the electronic gift certificate card based upon usage of the electronic gift certificate card.

7. A multifunction card system as recited in claim 1, further comprising means for associating loyalty data with the electronic gift certificate card based upon usage of the electronic gift certificate card.

8. A multifunction card system as recited in claim 1, wherein said means for receiving electronic gift certificate activation data from an existing standard retail point-of-sale device when said electronic gift certificate card is swiped through the point-of-sale device employs the banking network.

9. A multifunction card system as recited in claim 1, further comprising:
   a. at least one phone card having a unique identification number encoded on it, said identification number comprising a bank identification number approved by the American Banking Association for use in a banking network, said identification number corresponding to the multifunction card system;
   b. means for receiving phone card activation data from an unmodified existing standard retail point-of-sale device when said phone card is swiped through the point-of-sale device, said phone card activation data comprising the unique identification number of the phone card and a phone card activation amount;
   c. means for activating an account corresponding to the phone card with a balance equal to the phone card activation amount;
   d. means for allowing a user of the phone card to obtain long distance telephone calling time having a value up to the balance of the account corresponding to the phone card; and
   e. means for decreasing the balance of the account corresponding to the phone card by the value of the long distance telephone calling time obtained.

10. A multifunction card system as recited in claim 9, further comprising:

a. means for receiving phone card recharge data from an existing standard retail point-of-sale device when said phone card is swiped through the point-of-sale device, said phone card recharge data comprising the unique identification number of the phone card and a phone card recharge amount; and b. means for increasing the balance of the account corresponding to the phone card by the phone card recharge amount.

11. A multifunction card system as recited in claim 9, wherein a single card with a single identification number can function as an electronic gift certificate card and as a phone card.

12. A multifunction card system as recited in claim 1, further comprising:

a. at least one loyalty card having a unique identification number encoded on it, said identification number comprising a bank identification number approved by the American Banking Association for use in a banking network, said identification number corresponding to the multifunction card system;

b. means for receiving loyalty data from an existing standard retail point-of-sale device when said loyalty card is swiped through the point-of-sale device, said loyalty data comprising the unique identification number of the loyalty card and purchase data; and c. means for crediting an account corresponding to the loyalty card with loyalty points based upon the purchase data.

13. A multifunction card system as recited in claim 12, wherein a single card with a single identification number can function as an electronic gift certificate card and as a loyalty card.

14. A multifunction card system as recited in claim 1, further comprising:

a. at least one medical information card having a unique identification number associated with it, said medical information card belonging to a patient;

b. a database comprising at least one record corresponding to said medical information card, said record containing medical history information about the patient; and c. means for allowing an authorized requester to obtain the medical history information about the patient using the unique identification number associated with the medical information card.

15. A multifunction card system as recited in claim 14, wherein a single card with a single identification number can function as an electronic gift certificate card and as a medical information card.

16. A prepaid phone card system, comprising:

a. at least one phone card having a unique identification number encoded on it, said identification number comprising a bank identification number approved by the American Banking Association for use in a banking network, said identification number corresponding to the prepaid phone card system;

b. means for receiving phone card activation data from an unmodified existing standard retail point-of-sale device when said phone card is swiped through the point-of-sale device, said phone card activation data comprising the unique identification number of the phone card and a phone card activation amount;

c. means for activating an account corresponding to the phone card with a balance equal to the phone card activation amount;

d. means for allowing a user of the phone card to obtain long distance telephone calling time having a value up to the balance of the account corresponding to the phone card; and e. means for decreasing the balance of the account corresponding to the phone card by the value of the long distance telephone calling time obtained.

17. A prepaid card system as recited in claim 16, further comprising:

a. means for receiving phone card recharge data from an existing standard retail point-of-sale device when said phone card is swiped through the point-of-sale device, said phone card recharge data comprising the unique identification number of the phone card and a phone card recharge amount; and b. means for increasing the balance of the account corresponding to the phone card by the phone card recharge amount.

18. A prepaid phone card system as recited in claim 16, wherein the first digit of said bank identification number is selected from group of numbers consisting of the numbers four and five.

19. A prepaid card system as recited in claim 16, wherein said means for receiving phone card activation data from an existing standard retail point-of-sale device when said phone card is swiped through the point-of-sale device employs the banking network.

20. A loyalty card system, comprising:

a. at least one loyalty card having a unique identification number encoded on it, said identification number comprising a bank identification number approved by the American Banking Association for use in a banking network, said identification number corresponding to the loyalty card system;

b. means for receiving loyalty data from an unmodified existing standard retail point-of-sale device when said loyalty card is swiped through the point-of-sale device, said loyalty data comprising the unique identification number of the card and purchase data; and c. means for crediting an account corresponding to the loyalty card with loyalty points based upon the purchase data.

21. A loyalty card system as recited in claim 20, wherein the first digit of said bank identification number is selected from a group of numbers consisting of the numbers four and five.

22. A loyalty card system as recited in claim 20, wherein said means for receiving loyalty data from an existing standard retail point-of-sale device when said loyalty card is swiped through the point-of-sale device employs the banking network.

23. A method of activating or recharging a prepaid card having a unique identification number encoded on it, the identification number comprising a bank identification number approved by the American Banking Association for use in a banking network, said identification number corresponding to a prepaid card system, comprising the steps of:

a. swiping the card through an unmodified existing standard retail point-of-sale device;

b. entering an amount into the point-of-sale device;

c. transmitting the identification number and the amount from the point-of-sale device to a processing hub;

d. crediting an account balance in a database with the amount;

e. allowing a user of the card to purchase goods and services using the card; and f. allowing a user of the card to obtain long distance telephone calling time using the card;

g. wherein the total of the value of the goods and services purchased and the long distance telephone calling time obtained using the card cannot exceed the account balance.

24. A method according to claim 23, further comprising the step of associating loyalty data with the card based upon usage of the card.

25. A method according to claim 24, further comprising the step of transferring loyalty data to a phone card issuer.

26. A method according to claim 23, wherein said step of transmitting the identification number and the amount from the point-of-sale device to a processing hub is carried out at least in part via the banking network.

27. A method of activating or recharging a prepaid phone card having a unique identification number encoded on it, the identification number comprising a bank identification number approved by the American Banking Association for use in a banking network, said identification number corresponding to a prepaid phone card system, comprising the steps of:

a. swiping the phone card through an unmodified existing standard retail point-of-sale device;

b. entering an amount into the point-of-sale device;

c. transmitting the identification number and the amount from the point-of-sale device to a processing hub;

d. transmitting the identification number and the amount from the processing hub to a prepaid phone card issuer hub;

e. crediting an account balance in a phone card database with the amount; and f. allowing a user of the phone card to obtain long distance telephone calling time having a value up to the account balance.

28. A method according to claim 27, wherein said step of transmitting the identification number and the amount from the point-of-sale device to a processing hub is carried out at least in part via the banking network.

29. A method of adding points to a loyalty card having a unique identification number encoded on it, the identification number comprising a bank identification number approved by the American Banking Association for use in a banking network, said identification number corresponding to a loyalty card system, comprising the steps of:

a. swiping the loyalty card through an unmodified existing standard retail point-of-sale device;

b. entering purchase data into the point-of-sale device;

c. transmitting the identification number and the purchase data from the point-of sale device to a processing hub; and d. crediting an account in a database with loyalty points based upon the purchase data.

30. A method according to claim 29, wherein said step of transmitting the identification number and the purchase amount from the point-of-sale device to a processing hub is carried out at least in part via the banking network.

31. A method according to claim 29, further comprising the step of allowing the owner of the loyalty card to redeem loyalty points for an item selected from the group consisting of goods, services, discounts on goods and services, long distance telephone calling time value, and money value.

32. A multifunction card system comprising:

a. at least one debit/medical services card having a unique identification number encoded on it comprising a bank identification number approved by the American Banking Association for use in a banking network;

b. a transaction processor receiving card data from an unmodified existing standard point-of-sale device, said card data including a unique identification number;

c. a processing hub receiving directly or indirectly said card data from said transaction processor; and d. said processing hub accessing a first database when the card functions as a debit card and said processing hub accessing a second database when the card functions as a medical card.

33. The multifunction card system of claim 32, wherein the unique identification number further comprises a medical identification number.

34. A system comprising:

a. at least one electronic gift certificate card having an electronic gift certificate card unique identification number encoded on it, said electronic gift certificate card unique identification number comprising a bank identification number approved by the American Banking Association for use in a banking network;

b. a transaction processor receiving electronic gift card activation data from an unmodified existing standard retail point-of-sale device, said electronic gift certificate card activation data including said unique identification number and an electronic gift certificate card activation amount;

c. a processing hub receiving directly or indirectly said activation data from said transaction processor; and d. said processing hub activating an account corresponding to the electronic gift certificate card unique identification number with a balance corresponding to the electronic gift certificate activation amount.

35. The system of claim 34, wherein the electronic gift certificate card activation amount is encoded in the unique identification number.

36. The system of claim 34, wherein the electronic gift certificate card activation amount is entered at the point-of-sale device.

37. The system of claim 34, wherein said processing hub allows a user of the electronic gift certificate card to purchase a value up to the balance corresponding to the electronic gift certificate activation amount.

38. The system of claim 34, wherein:

a. said transaction processor receives electronic gift certificate card recharge data from the existing standard retail point-of-sale device, said electronic gift certificate card recharge data including said unique identification number and an electronic gift certificate card recharge amount; and b. said processing hub increasing said amount corresponding to the electronic gift certificate card unique identification number with a balance corresponding to the electronic gift certificate card recharge amount.

39. The system of claim 34, wherein the first digit of the bank identification number is selected from a group of numbers consisting of the numbers four and five.

40. The system of claim 34, wherein the processing hub allows the use of the electronic gift certificate card to obtain phone calling time.

41. The system of claim 34, further comprising:

a. a prepaid phone card issuer hub receiving directly or indirectly the electronic gift card activation data from said processing hub; and b. said prepaid phone card issuer hub activating a record in a phone card database corresponding to the electronic gift certificate card unique identification number.

42. The system of claim 41, wherein the prepaid phone card issuer hub instructs the processing hub to seize the account corresponding to the electronic gift certificate card unique identification number where an electronic gift certificate card is used to make a call.

43. The system of claim 41, wherein the processing hub instructs the phone card issuer hub to seize the record corresponding to the electronic gift certificate card unique identification number when the electronic gift certificate card is used to make a transaction.

44. The system of claim 34, wherein the transaction processor is coupled to the banking network.

45. The system of claim 34, wherein the processing hub associates loyalty data with the electronic gift certificate card based upon the usage of the electronic gift certificate card.

46. The system of claim 34, wherein the activation data received at the processing hub is encrypted.

47. The system of claim 34, wherein the processing hub includes a loyalty card database.

48. The system of claim 34, wherein the processing hub includes a medical information card database.

49. The system of claim 34, wherein the processing hub includes an electronic gift certificate card database, a loyalty card database, and a medical information database.

50. A multifunction card system comprising:
   a. at least one electronic gift certificate card having an electronic gift certificate card unique identification number encoded on it, said electronic gift certificate card unique identification number comprising a bank identification number approved by the American Banking Association for use in a banking network;
   b. a transaction processor receiving electronic gift card activation data from an unmodified existing standard retail point-of-sale device, said electronic gift certificate card activation data including the electronic gift certificate card unique identification number and an electronic gift certificate card activation amount;
   c. a processing hub receiving directly or indirectly said activation data from said transaction processor; and
   d. said processing hub activating an account corresponding to the electronic gift certificate card unique identification number with a balance corresponding to the electronic gift certificate activation amount.

51. The multifunction card system of claim 50, wherein the electronic gift certificate card activation amount is encoded in the unique identification number.

52. The multifunction card system of claim 50, wherein the electronic gift certificate card activation amount is entered at the point-of-sale device.

53. The multifunction card system of claim 50, further comprising:
   a. at least one phone card having a phone card unique identification number encoded on it, said phone card unique identification number comprising a bank identification number approved by the American Banking Association for use in a banking network;
   b. said transaction processor receiving phone card activation data from said existing standard retail point-of-sale device, said phone card activation data including said phone card unique identification number and a phone card activation amount;
   c. said processing hub receiving directly or indirectly said phone card activation data from said transaction processor and recognizing the phone card unique identification number of the phone card as being associated with a particular prepaid phone card issuer; and
   d. said processing hub forwarding the phone card activation data to a particular prepaid phone card issuer hub.

54. The multifunction system of claim 53, wherein the particular prepaid phone card issuer hub contains at least one phone card database which stores information about each said phone card and activates the stored information to permit debiting of a predetermined value of phone calling in response to the activation data.

55. The multifunction system of claim 50, further comprising:
   a. at least one loyalty card having a loyalty card unique identification number encoded on it, said loyalty card identification number comprising a bank identification number approved by the American Banking Association for use in a banking network;
   b. said transaction processor receiving loyalty card activation data from said existing standard retail point-of-sale device, said loyalty card activation data including said loyalty card unique identification number and purchase data;
   c. said processing hub receiving directly or indirectly said phone card activation data from said transaction processor; and
   d. said processing hub crediting an account corresponding to the loyalty card with loyalty points based upon the purchase data.

56. The multifunction system of claim 50, further comprising:
   a. at least one medical information card having a medical card unique identification number associated with it, said medical information belonging to a patient; and
   b. said processing hub including at least one record corresponding to said medical information card, said record containing medical history information about the patient.

57. A multifunction card system comprising:
   a. at least one card having a unique identification number encoded on it, said identification number comprising a bank identification number approved by the American Banking Association for use in a banking network;
   b. a transaction processor receiving card activation data from an unmodified existing standard retail point-of-sale device, said card activation data including said unique identification number;
   c. a processing hub receiving directly or indirectly said activation data from said transaction processor; and
   d. said processing hub activating an account corresponding to the unique identification number, thereby permitting later access to said account.

58. The multifunction card system of claim 57, wherein said card is selected from the group consisting of an electronic gift certificate card, a phone card, a loyalty card, and a medical information card.

59. The multifunction card system of claim 57, wherein said card performs the functions of an electronic gift certificate card, a phone card, a loyalty card, and a medical information card.

60. A method of activating a prepaid card having a unique identification number encoded on it, the identification number comprising a bank identification number approved by the American Banking Association for use in a banking network, the method comprising the steps of:
   a. swiping the card through an unmodified existing standard point-of-sale device;
   b. transmitting the identification number and an activation amount from the point-of-sale device to a processing hub; and c. activating an account in the processing hub corresponding to the identification number.

61. The method of claim 60, further comprising:
a. transmitting the identification number and a recharge amount from the point-of-sale device to a processing hub; and
b. recharging the account in the processing hub corresponding to the identification number.

62. The method of claim 60, further comprising entering the activation amount into the point-of-sale device.

63. The method of claim 60, wherein the step of transmitting the identification number and the activation amount from the point-of-sale device is carried out at least in part over the banking network.

64. The method of claim 60, further comprising allowing a user of the card to obtain calling time using the card.

65. The method of claim 60, further comprising allowing a user of the card to purchase goods and services using the card.

66. The method of claim 60, further comprising associating loyalty data with the card based upon usage of the card.

* * * * *

(12) EX PARTE REEXAMINATION CERTIFICATE (9123rd)
United States Patent
Dorf

(10) Number: US 6,000,608 C1
(45) Certificate Issued: Jul. 10, 2012

(54) MULTIFUNCTION CARD SYSTEM

(75) Inventor: Robert E. Dorf, Raleigh, NC (US)

(73) Assignee: AlexSam, Inc.

Reexamination Request:
No. 90/009,793, Aug. 2, 2010

Reexamination Certificate for:
Patent No.: 6,000,608
Issued: Dec. 14, 1999
Appl. No.: 08/891,261
Filed: Jul. 10, 1997

(51) Int. Cl.
*G07F 7/08* (2006.01)
*G07F 7/10* (2006.01)

(52) U.S. Cl. .................. 235/380; 235/375; 235/376
(58) Field of Classification Search .................. None
See application file for complete search history.

(56) References Cited

To view the complete listing of prior art documents cited during the proceeding for Reexamination Control Number 90/009,793, please refer to the USPTO's public Patent Application Information Retrieval (PAIR) system under the Display References tab.

*Primary Examiner* — John M Hotaling

(57) ABSTRACT

Disclosed is a multifunction card system which provides a multifunction card capable of serving as a prepaid phone card, a debit card, a loyalty card, and a medical information card. Each card has an identification number comprising a bank identification number which assists in establishing communications links. The card system can be accessed from any existing point-of-sale (POS) device. The POS device treats the card as a credit or debit card and routes transaction data to a processing hub using the banking system. The processing hub coordinates the various databases corresponding to the various functions of the card.

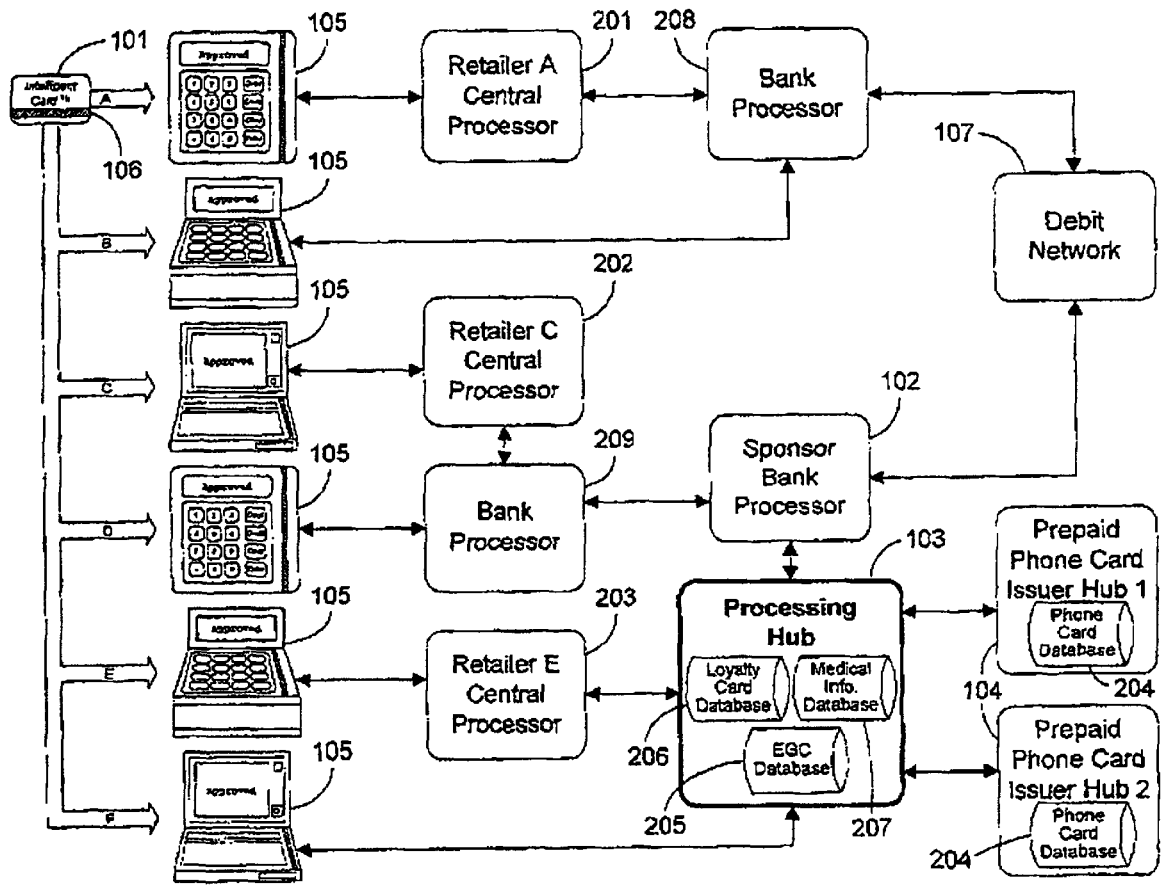

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 3-5, 8-11, 16-19, 23, 26-28, 34, 36, 37, 39-44, 50, 52-54, 57, 58, 60, 62, 63 and 65 is confirmed.

Claims 2, 6, 7, 12-15, 20-22, 24, 25, 29-33, 35, 38, 45-49, 51, 55, 56, 59, 61, 64 and 66 were not reexamined.

* * * * *